No. 848,729. PATENTED APR. 2, 1907.
H. L. DOHERTY.
PROCESS OF PRODUCING GAS.
APPLICATION FILED MAY 12, 1906.
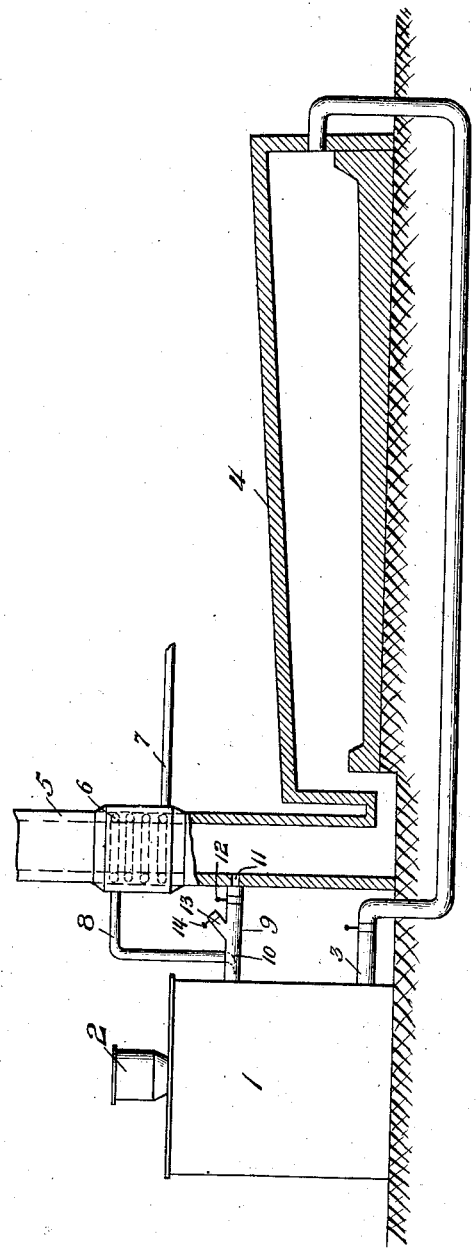
Witnesses
Inventor
Henry L. Doherty
By K. P. McElroy
Attorney

UNITED STATES PATENT OFFICE.

HENRY L. DOHERTY, OF MADISON, WISCONSIN.

PROCESS OF PRODUCING GAS.

No. 848,729.   Specification of Letters Patent.   Patented April 2, 1907.

Application filed May 12, 1906. Serial No. 316,535.

*To all whom it may concern:*

Be it known that I, HENRY L. DOHERTY, a citizen of the United States, residing in Madison, county of Dane, and State of Wisconsin, have invented certain new and useful Improvements in Processes of Producing Gas; and I do hereby declare the following to be a full, clear, and exact description of the same, such as will enable others skilled in the art to which it appertains to make and use the same.

This invention relates to processes of producing gas, and consists in a method of operating gas-producers under certain novel conditions whereby high temperatures may be maintained in gas-making zones of a producer without the usual difficulties and whereby gases of novel and advantageous character may be produced and also in certain detailed procedures applicable in such method, all as more fully hereinafter set forth and as claimed.

While it is recognized that the operation of gas-producers with downdraft is attended with a number of advantages, chemical and physical, downdraft is seldom used in practice, for the reason that the coal mass pits and channels, causing localized intense combustion with in turn more pitting. The downdraft is in the opposite direction to the natural flow of heated gases, and it is difficult to induce the draft-current to permeate evenly the bed of fuel. With updraft the same tendency to pit and channel exists, though not to the same degree. Acceleration of draft is apt to increase this difficulty rather than diminish it, and the same is true of heated draft-currents. The combustion of carbon increases in velocity with the temperature, and a spot of localized high temperature tends to spread and increase in size, the development of heat tending to form more heat and to develop a pocket. As a pocket forms the air tends to follow, aggravating the trouble and also making it likely that air will penetrate the fuel mass without contacting or contacting for an insufficient time for full reaction, thereby stratifying the resultant gas or burning with it to produce useless carbon dioxid.

Running producers hot with rapid fuel-feed and consumption and with hot or accelerated draft, though obviously advantageous as giving greater output, has hitherto been considered undesirable, both for the foregoing reasons and because of certain purely incidental disadvantages with most coals caused by the fusibility of their ash resulting in such high temperature, rapid operation in slagging, or sintering of such ash. Conditions in the producer generally have to be adapted to the peculiarities of the coal-ash rather than to the needs of the gas-making process proper, and many coals otherwise suitable are deemed unavailable because of having fusible ash. Nor in the ordinary practice is there much elasticity in response to sudden demands for larger quantities of gas. Blast velocities, coal consumption, and producer temperatures all have limitations which it is deemed unwise to exceed, there being a certain limiting number of pounds of coal which can be converted per square foot of cross-section without danger of clinkering, injuring grate-bars, or channeling the fuel mass.

It is the object of the present invention to obviate the stated disadvantages and enable producers to be run at comparatively high temperatures in gasifying zones, to utilize more of the cubic capacity of a gas-producer, to employ high-velocity draft-currents and convert more coal per unit of time, and to use a downdraft without fear of pocketing.

In the present method instead of endeavoring to keep temperatures in the ignited zones of the fuel at a point below the clinkering temperature of the ash, as is customary, the fusibility of the ash is disregarded and operation in these gasifying zones is at comparatively high temperature, the special degree depending upon the character of the gas sought. There is a difference in the character of gas corresponding to every special temperature. An automatic method for maintaining the temperature in the gasifying zones at any desired given point is hereinafter described.

In the usual operation with updraft the incoming air first meets the coal in the immediate vicinity of the ash. The first layer burned is that which is more or less mixed with such ash. This is also the point where the maximum temperature develops and the result, with a pure-air draft, is apt to be a sintering of the ash and other disadvantages. Acceleration of the draft-current or the use of heated draft increases these difficulties. The ash particles are finely divided, chemically clean, and in close juxtaposition to each other—all conditions which tend to promote formation of clinker. In the fuel itself, on the other hand, the ash particles are not in contact and are relatively remote from each other. They are, so to speak, "separated" or "insulated" from each other by the particles of the fuel itself. In such a position it is quite immaterial how high a heat they be subjected to. They may be, of course, melted to thin fluidity or any degree short of that point without the least danger of their agglomerating together to form clinker or slag as long as they are kept separate. Therefore if the draft-current be introduced in the same direction as the coal, as in a top-fed downdraft producer the producer may be operated as hot as may be desired and with hot or rapid draft, so long as the excessively high temperatures do not extend to the ashbed. Of this there is little danger with a deep bed of fuel, provided channeling or formation of pit-holes can be avoided. This may be done by an expedient later described, and this expedient makes it even possible to extend the zone of high temperature farther into the fuel-bed than is usually done not only without risk, but with manifest advantage. Such extension of the high-temperature zone is desirable as increasing the output and capacity of a producer. In the usual operation intense heat is produced in the first layer exposed to the draft, carbon dioxid being there formed with a pure-air draft, and this dioxid is again reduced in the next layer with absorption of heat. The result is that in such ordinary operation the temperatures rapidly decrease away from the first glowing layer of fuel. The temperature gradations between layer and layer are very sharp, with the result that the useful work of the producer is ordinarily done by a comparatively thin stratum. Therefore in certain embodiments of this invention it is preferred to diminish the rate of this cooling effect by accelerating the draft-current and feeding to the first glowing layer at a rate faster than the fuel in this layer can react therewith, thereby carrying sensible heat and carbon-oxidizing gases into remoter layers. Such heating of the remoter layers, however, is not allowed to extend to the ash accumulation in a degree which would tend to produce clinker. The object is to produce an evener gradation of heat throughout the fuel mass without the sharp changes in temperature found in the usual methods.

Using high-blast velocities and high temperatures in the draft-current, high temperatures are created in the first glowing layer of coal, which in the case of the downdraft operation now under description is usually eight or ten inches beneath the layer of fresh fuel, and with coals having fusible ash the ash particles often melt in the coke, forming small globules or rounded particles. As the carbon around them disappears these sink downward, and in passing through layers of gradually-decreasing temperature they solidify or lose their adhesiveness before coming into actual contact in the ash accumulation. The result with many coals is an ash accumulation of novel characteristics, it being composed of congeries of small globules or rounded particles. It is sandy in lieu of being flaky or sintered. In the producer it is much more easily handled than the usual types of ash.

The velocity of the combustion of carbon with pure air being great, it is difficult to produce the regulated distribution of heat throughout the fuel mass with a pure-air draft; but it may easily be done with an air-draft containing an endothermic constituent which will damp combustion more or less. Such a draft-current is found in the one used to restrain pocketing or channeling—a mixture of air with relatively high proportions of carbon dioxid or products of combustion containing the same. Waste gases from operations decomposing carbonates—as in burning lime, making glass, smelting iron, and the like—can contain more carbon dioxid than ordinary products of combustion and are particularly useful in this connection. With such a draft-current containing dioxid in relatively large proportion the tendency to pocket is obviated by an automatic chemical reaction, and the utilization of this reaction is a material aid in making possible to use high temperatures, high speed of draft, and quick operation with extension of reaction through the fuel mass to obtain high duty from the producer.

In the reduction of carbon dioxid to carbon monoxid by glowing carbon the velocity of the reaction is a function of the prevailing temperature and increases more rapidly than does the temperature with a rise in heat—that is, the higher the temperature the more dioxid is reduced in a unit of time—but the reaction is attended with absorption of heat, and consequently the greater the temperature the more heat is absorbed in a unit of time and the more the temperature tends to fall, and conversely. The speed of reaction, further, also depends upon the concentration of the carbon dioxid in the draft-current or its "partial pressure." The greater this partial pressure the more will be reduced in a unit of time. The chemical chilling which results from the reduction of course can be compensated for, wholly or in part, by imparting sensible heat to the draft-current.

It will be seen that with a rapid draft-current containing much carbon dioxid and kept at a given temperature the reaction is automatic and self-checking, rise or fall of temperature in the fuel mass above or below a fixed point being restrained. These properties are much more apparent with the producer run at the relatively high temperatures employed in the preferred embodiment of this invention. By regulating the proportion of endothermic constituent in the draft-current, regulating the temperature with which it strikes the first ignited layer of fuel, and regulating its speed I can maintain substantially any temperature desired within a wide range in said layer. Heating the draft-current and increasing its content of carbon dioxid tend to compensate each other, and by raising the temperature to a sufficient degree it can be made to carry very large per cents of dioxid. In this relation it is possible to use a balanced draft-current—i. e., one in which the air and the endothermic constituent neutralize thermally each other in their action upon the fuel, and the fuel in the producer therefore remains in a static condition so far as the influence of the draft-current is concerned. In such an event it is necessary to supply the draft-current hot. This heat may be derived from the heat of the issuing gas by the usual regenerative devices.

With a draft-current containing large proportions of carbon dioxid if the fuel begins to heat above the desired degree the reduction of dioxid and chilling are more than proportionately accelerated and the temperature is brought back to the desired point, or if the fuel cools somewhat reduction of dioxid in the surface layers diminishes somewhat and the temperature rises. With each given draft-current of given temperature a definite temperature will be established in a given mass of coal and automatically tend to remain constant. This which is true of the mass is also true of individual spots, and if such a spot begins to burn hot and develop a pit-hole the increased reduction of dioxid quickly brings back its temperature to the general average.

By the described method the producer may be run at any temperatures and the excessively-high degrees hitherto precluded by fusibility of ash with some coals become practicable, the temperature adopted can be kept very exactly, and thereby a very exact quality of gas produced, and the producer may be run at high speed even with downdraft without production of pit-holes or channels. Use of the described very hot high-dioxid draft in downdraft is very advantageous with sundry highly-bituminous coals not ordinarily considered adapted to producer purposes, as the hot draft cokes the fresh coal on the top layer and carries the distillation products down into the ignited layers for cracking. Further, as carbon dioxid has a specific damping action on the reaction of oxygen and carbon, materially slowing it in point of time, it is easy with the described draft-current to carry much of the same unchanged into deep layers of the fuel beyond the first glowing layer. This passing current carries with it much sensible heat, and this, together with the heat evolved by the unchanged oxygen, suffices to institute the gas-making reaction in such deeper layers. Preferably draft-current speed, temperature, and composition are so regulated as to maintain a gradually-decreasing temperature from the very hot first glowing layer down to the layer of fuel next the ash-accumulation, this latter layer being kept as hot as may be without clinkering said ash. There is an additional advantage in rushing the draft-currents through the fuel mass at the speeds described, in that it enables, if desired, some of the draft-current to mix with the produced gas, thereby giving combustible gases of any desired regulated length of flame and speed of combusiton, even to gases so weak as to be incapable of burning without heated air or radiant heat. Such gases are useful in many arts. In their production it is ordinarily desirable to pass both oxygen and carbon dioxid through the fuel mass to become admixed with the gas. Though the gas has both oxygen and combustible in it, the influence of the carbon dioxid prevents much combustion, and it may be readily cooled and conveyed to a place of use. To obtain a gas of this character, a very rapid draft-current containing large proportions of carbon dioxid should be employed, such as speed of travel being employed as to cause the desired amount of such draft-current to go through the deep bed of fuel unchanged. Using a deep bed of coke or other fuel, a gas can be obtained of any desired rate of combustion or flame volume. Incidentally, of course, the other advantages of temperature regulation in the producer and extended conversion of fuel are also obtained.

Briefly stated, the present invention, in the embodiment now preferred, consists in establishing a deep bed or other large mass of incandescent fuel and traversing it with a draft-current flowing in the same direction as the feed of fuel, said draft-current preferably containing much carbon dioxid or other endothermic constituent and being supplied under accelerated draft; in maintaining the first ignited layer of fuel at a very high temperature plane, even so high as to freely fuse ash ingredients therein, and maintaining subsequent layers at a high but less temperature, with gradual diminution to the ash accumulation. Preferably the draft-current is supplied hot and containing an amount of carbon dioxid sufficient to check localized undue developments of heat, and in combination with the heat of the draft and the exothermic action of the air thereof to maintain the temperature of the said first-ignited layer at a desired point, and in combination also with the velocity of the current to maintain the graded heat of remoter layers in the manner described. It is preferred to use a sufficiently rapid current to cause more or less thereof to pass through the ignited layer, thereby maintaining therein the necessary excess of carbon dioxid to perform the reactions described and react with lower layers or even to penetrate the fuel mass and dilute the resultant gas.

The described method of automatically controlling the temperature in the first-ignited layer of a fuel mass, of extending gas production into remote layers, and of preventing channeling is applicable to any producer whether operating under high or low tension or up or down draft. By regulating the relations of temperature, composition, and speed of the draft-current any desired temperature may be automatically set and maintained in the first-ignited layer and also in subsequent layers and channeling prevented.

With a given draft-current supplied at a given velocity and given temperature to a mass of given fuel there will be a definite temperature and temperature gradation set up in the mass of fuel. Should the temperature of the fuel-bed increase at any particular point or throughout, the rapidity with which the reduction of carbon dioxid takes place will be accelerated at a rate greater than the rise in temperature, provided the percentage of carbon dioxid in the draft-current remains constant, regardless of the tension at which the producer is operated. In this manner the temperature rise of the fuel-bed is opposed by an ever-increasing reduction of carbon dioxid and ever-increasing chemical chilling. On the other hand, if the temperature tends to fall the reduction of carbon dioxid, and consequently the chilling, decreases at a more rapid rate than the fuel-body cools off.

The method of adjusting the flame volume of a gas yielded by a producer by increasing or diminishing the amount of the draft-current rushed through the fuel mass is also of course applicable to any producer. It is merely a matter of adjusting the composition of the draft-current and its rate of travel to produce with any deep bed of fuel a gas of a given rate or burning or flame volume.

In the accompanying illustration is shown more or less diagrammatically apparatus suitable for carrying out this process.

In the drawings, 1 is a gas-producer provided with the usual feed-hopper 2 and having a gas-outlet 3 near its base. As shown, this gas is delivered into a puddling-furnace 4, diagrammatically shown. Intensely-hot products of combustion from this furnace rise through stack 5, containing a stack air-heater 6. Air is furnished to the heater through pipe 8, which enters draft-pipe 9, having a jet-nozzle 10 therein. The draft-pipe taps the stack at 11, drawing off said stack-gases therefrom by the injector action of the air-jet. It is provided with damper 12 and an auxiliary air-inlet 13, open directly to the atmosphere and controlled by valve 14. By proper adjustment of these valves and of the force of air-jet, mixtures of air and products of combustion of any desired nature may be introduced into the producer above the fuel therein.

What I claim is—

1. In the operation of a downdraft gas-producer, the process which consists in maintaining the first-ignited layers of fuel therein at a temperature sufficient to fuse ash ingredients and lower layers at a gasifying temperature below said first-stated temperature by an accelerated draft-current of commingled exothermic and endothermic components traversing said first-ignited layers at a speed greater than the reactive rapidity of the same.

2. In the operation of a downdraft gas-producer, the process which consists in maintaining the first-ignited layers of fuel therein at a temperature sufficient to fuse ash ingredients and lower layers at a gasifying temperature below said first-stated temperature by a hot accelerated draft-current of commingled exothermic and endothermic components traversing said first-ignited layers at a speed greater than the reactive rapidity of the same.

3. In the operation of a downdraft gas-producer, the process which consists in maintaining the first-ignited layers of fuel therein at a temperature sufficient to fuse ash ingredients and lower layers at a gasifying temperature below said first-stated temperature by a hot accelerated draft-current of commingled exothermic and endothermic components in thermally-balancing proportions traversing said first-ignited layers at a speed greater than the reactive rapidity of the same, recovering heat from the outflowing gas and adding it to the inflowing gases.

4. The process of producing gas which consists in establishing and maintaining a deep bed of hot fuel and transmitting through the same an accelerated draft-current of commingled air and products of combustion at a velocity sufficiently great to insure a regulated proportion of said draft-current passing through the fuel unchanged, thereby imparting sensible heat to the remoter layers of fuel and yielding a gas of regulated dilution.

5. The process of producing gas which consists in establishing and maintaining a deep bed of hot fuel and transmitting through the same under accelerated velocity a hot draft-current of commingled air and products of combustion in the same direction as the feed of fuel, the temperature of said draft-current being maintained sufficiently high to permit fusion of ash ingredients in the first-ignited layers of the fuel and its velocity being sufficiently great to insure a regulated portion passing through the fuel unchanged, thereby imparting sensible heat to the underlying layers of fuel and yielding a gas of regulated dilution.

6. The process of producing gas which consists in establishing and maintaining a deep bed of hot fuel, and in transmitting therethrough a hot draft-current of commingled air and products of combustion at sufficient velocity to insure a regulated portion going through the fuel unchanged, thereby yielding a gas of regulated dilution.

7. The process of producing gas which consists in establishing and maintaining a deep bed of ignited fuel and in transmitting downward through the same an accelerated draft-current of commingled air and products of combustion at a sufficient velocity to cause reaction throughout the depth of said bed, said draft-current traveling at a greater speed than the reaction speed of the first-ignited layers.

8. The method of heating remoter layers of fuel in a deep bed of fuel which consists in transmitting through said fuel a draft-current at a velocity greater than the reaction speed of the first-ignited layers.

9. In the operation of a gas-producer, the method of obviating channeling in the fuel-bed which consists in transmitting through the fuel-bed a draft-current rich in carbon dioxid at a speed greater than the reactive speed of the first-ignited layers.

10. The process of producing gas which consists in establishing and maintaining a deep bed of ignited fuel, mingling air with products of combustion to produce a draft-current, and feeding said draft-current downward through the ignited fuel at a speed greater than the reactive speed of the first-ignited layers with the components of the draft-current and at a speed sufficient to cause reaction throughout the entire depth of said bed.

11. The process of producing gas which consists in establishing and maintaining a deep bed of hot fuel and transmitting therethrough a hot incombustible draft-current of commingled air and products of combustion in exothermic and endothermic balance, the sensible heat of the draft-current being sufficient to maintain the temperature of the producer at a given point and obviate heat losses.

12. The process of producing gas which consists in establishing and maintaining a deep bed of hot fuel, transmitting therethrough a hot draft-current of commingled air and products of combustion in exothermic and endothermic balance, recovering heat from the gas produced and adding it to the inflowing draft-current.

In testimony whereof I affix my signature in the presence of two witnesses.

HENRY L. DOHERTY.

Witnesses:
 FRED I. SMITH,
 T. H. FAIR.